(12) United States Patent
Pretz et al.

(10) Patent No.: US 10,464,036 B2
(45) Date of Patent: Nov. 5, 2019

(54) CATALYST REGENERATOR AND A RISER TERMINATOR USED THEREIN

(71) Applicant: Dow Global Technologies LLC, Midland, MI (US)

(72) Inventors: Matthew T. Pretz, Freeport, TX (US); Don F. Shaw, Denville, NJ (US); Richard E. Walter, Long Valley, NJ (US); Madhusudhan Kodam, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/761,557

(22) PCT Filed: Sep. 28, 2016

(86) PCT No.: PCT/US2016/054084
§ 371 (c)(1),
(2) Date: Mar. 20, 2018

(87) PCT Pub. No.: WO2017/058856
PCT Pub. Date: Apr. 6, 2017

(65) Prior Publication Data
US 2018/0264424 A1    Sep. 20, 2018

Related U.S. Application Data

(63) Continuation of application No. 14/870,368, filed on Sep. 30, 2015, now Pat. No. 9,597,652.

(51) Int. Cl.
*B01J 8/00* (2006.01)
*B01J 8/18* (2006.01)
(Continued)

(52) U.S. Cl.
CPC ............. *B01J 8/24* (2013.01); *B01J 38/30* (2013.01); *C10G 11/182* (2013.01); *B01J 2208/00991* (2013.01)

(58) Field of Classification Search
CPC .. B01J 19/00; B01J 19/24; B01J 2208/00796; B01J 2208/00991; B01J 8/00; B01J 8/18; B01J 8/24
(Continued)

(56) References Cited

U.S. PATENT DOCUMENTS

| 4,753,907 A | 6/1988 | Zandona et al. |
| 6,039,863 A | 3/2000 | Palmas |

(Continued)

FOREIGN PATENT DOCUMENTS

WO    2014070425 A1    5/2014

OTHER PUBLICATIONS

International Search Report and Written Opinion pertaining to PCT/US2016/054084 dated Dec. 19, 2016.
(Continued)

*Primary Examiner* — Huy Tram Nguyen
(74) *Attorney, Agent, or Firm* — Dinsmore & Shohl LLP (57) ABSTRACT

A catalyst regenerator for combusting carbonaceous deposits from a catalyst comprising a first chamber which comprises a catalyst inlet for feeding spent catalyst with carbonaceous deposits to said first chamber, a supplemental fuel gas distributor, and a distributor for an oxygen containing gas for distributing oxygen containing gas into said first chamber to contact said spent catalyst and combust carbonaceous deposits and supplemental fuel which further deactivates the spent catalyst and generates flue gas; a riser section extending from said first chamber for transporting the spent catalyst and the flue gas, the riser section comprising an outer wall, at least one slot in the outer wall, and
(Continued)

a riser termination device which comprises a substantially internally flat cover plate, at least one arm extending from the cover plate, wherein the arm extends about the slot from the outer wall, the arm comprising an outer shell that encloses the arm and wherein no internal portion of the cover plate extends above an upper surface of the outer shell of the at least one arm is provided. Further provided is a riser termination device.

15 Claims, 6 Drawing Sheets

(51) Int. Cl.
*B01J 8/24* (2006.01)
*B01J 19/00* (2006.01)
*B01J 19/24* (2006.01)
*B01J 38/30* (2006.01)
*C10G 11/18* (2006.01)

(58) Field of Classification Search
USPC .......................................................... 422/144
See application file for complete search history.

(56) References Cited

U.S. PATENT DOCUMENTS

| | | |
|---|---|---|
| 6,491,875 B1 | 12/2002 | Palmas |
| 6,797,239 B1 | 9/2004 | Chen et al. |
| 7,799,287 B2 | 9/2010 | Hedrick et al. |
| 7,902,101 B2 | 3/2011 | Hedrick et al. |
| 8,415,264 B2 | 4/2013 | Myers et al. |
| 9,597,652 B1* | 3/2017 | Pretz .......................... B01J 8/24 |
| 9,687,765 B2* | 6/2017 | Pretz ...................... B01J 8/1809 |
| 2007/0049782 A1 | 3/2007 | Patel et al. |
| 2008/0081006 A1* | 4/2008 | Myers ...................... B01J 4/002 |
| | | 422/145 |
| 2010/0175553 A1* | 7/2010 | Andreux ................ B01D 45/06 |
| | | 95/271 |
| 2014/0200385 A1 | 7/2014 | Pretz et al. |

OTHER PUBLICATIONS

International Preliminary Report on Patentability pertaining to PCT/US2016/054084 dated Apr. 3, 2018.
Second Examination Report dated Feb. 18, 2019 relating to corresponding GCC patent application No. 2016-32053.
Office Action dated Mar. 18, 2019 relating to corresponding Russian patent application No. 2018 113 311.

* cited by examiner

CATALYST REGENERATOR AND A RISER TERMINATOR USED THEREIN

FIELD OF INVENTION

The disclosure relates to a catalyst regenerator and a riser terminator used therein.

BACKGROUND OF THE INVENTION

Catalyst regenerators are used in a number of chemical process operations, including fluid catalytic cracking and catalytic dehydrogenation of lower alkanes. Conventional regenerators typically include a vessel having a spent catalyst inlet, a catalyst outlet and a distributor for supplying oxygen containing gas to the catalyst bed in the vessel. Two stage regenerators typically comprise two vessels which complete the oxygen contacting in two distinct steps. In a two stage process, the partially spent catalyst along with a gas in which the catalyst particles are entrained enter the lower vessel and rise through a riser which is capped with a riser terminator. In an outer wall of a top portion of the riser are openings, or slots, which allow the spent catalyst and product gas to exit the riser. The riser terminator typically has a cap and a plurality of arms enclosing the slots. The cap of conventional riser terminators generally resides a predetermined distance above the slots, providing internal riser space above the slots into which some of the gas and entrained catalyst particles may enter and impinge upon refluxing catalyst and the terminator cap. Such impingement with other refluxing particles causes breaking, or attrition, of some of the catalyst particles. After leaving the riser through the slots and the arms, the catalyst and gas passes into one or more cyclone separators. It is desirable to obtain separation of the catalyst and gas prior to the gas entering the one or more cyclones which will, in turn, remove >99% of the catalyst particles from the gas.

SUMMARY OF THE INVENTION

In one embodiment, the disclosure provides a catalyst regenerator for combusting carbonaceous deposits from a catalyst comprising a first chamber including a catalyst inlet for feeding spent catalyst with carbonaceous deposits to said first chamber, an optional supplemental fuel gas, and a gas containing oxygen such as air to a distributor for distributing said gas into said first chamber to contact said spent catalyst and combust carbonaceous deposits and the optional supplemental fuel to provide at least a reheated and decoked catalyst that is further deactivated and generate flue gas; a riser section extending from said first chamber for transporting the spent catalyst and the flue gas, the riser section comprising an outer wall, at least one slot in the outer wall, and a riser termination device which comprises a substantially internally flat cover plate, at least one arm extending from the cover plate, wherein the arm extends about the slot from the outer wall, the arm comprising an outer shell that encloses the arm and wherein no internal portion of the cover plate extends above an upper surface of the outer shell of the at least one arm.

In another embodiment, the disclosure provides a riser termination device comprising: (a) substantially internally flat cover plate; and (b) at least one arm extending from the cover plate; wherein no portion of the cover plate extends above any portion of the at least one arm.

DETAILED DESCRIPTION OF THE INVENTION

Figure 1:
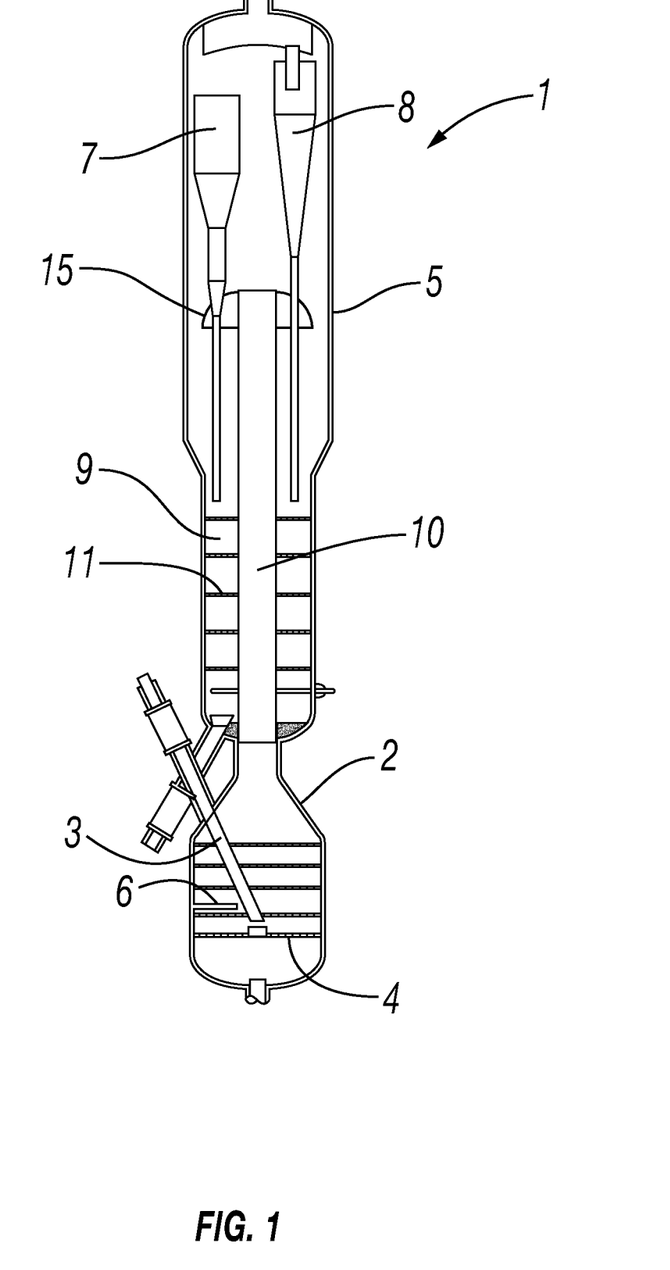
FIG. 1 is an elevational view of a first embodiment of the catalyst regenerator.

Referring to FIG. 1, the catalyst regenerator 1 for combusting carbonaceous deposits from a catalyst is shown. The catalyst regenerator 1 includes a first chamber 2 including a catalyst inlet 3 and a second chamber 5. The catalyst regenerator 1 also includes an oxygen-containing gas distributor 4 and a supplemental fuel distributor, 6. A riser section 10 extends from the first chamber 2. The second chamber 5 includes one or more cyclone separators and a reconditioning zone. As shown in FIG. 1, a primary cyclone 7 and secondary cyclone 8 may be present. Reconditioning zone 9 is used to contact the further deactivated catalyst particles with oxygen. The top of riser section 10 includes a riser termination device 15. A plurality of grids 11 may be present in a lower section of the second chamber 5. The processes conditions for operating a catalyst regenerator for propane dehydrogenation catalyst as shown in FIG. 1 are generally described in US Patent Application Publication 20140200385, the disclosure of which is incorporated herein by reference.

Figure 2:
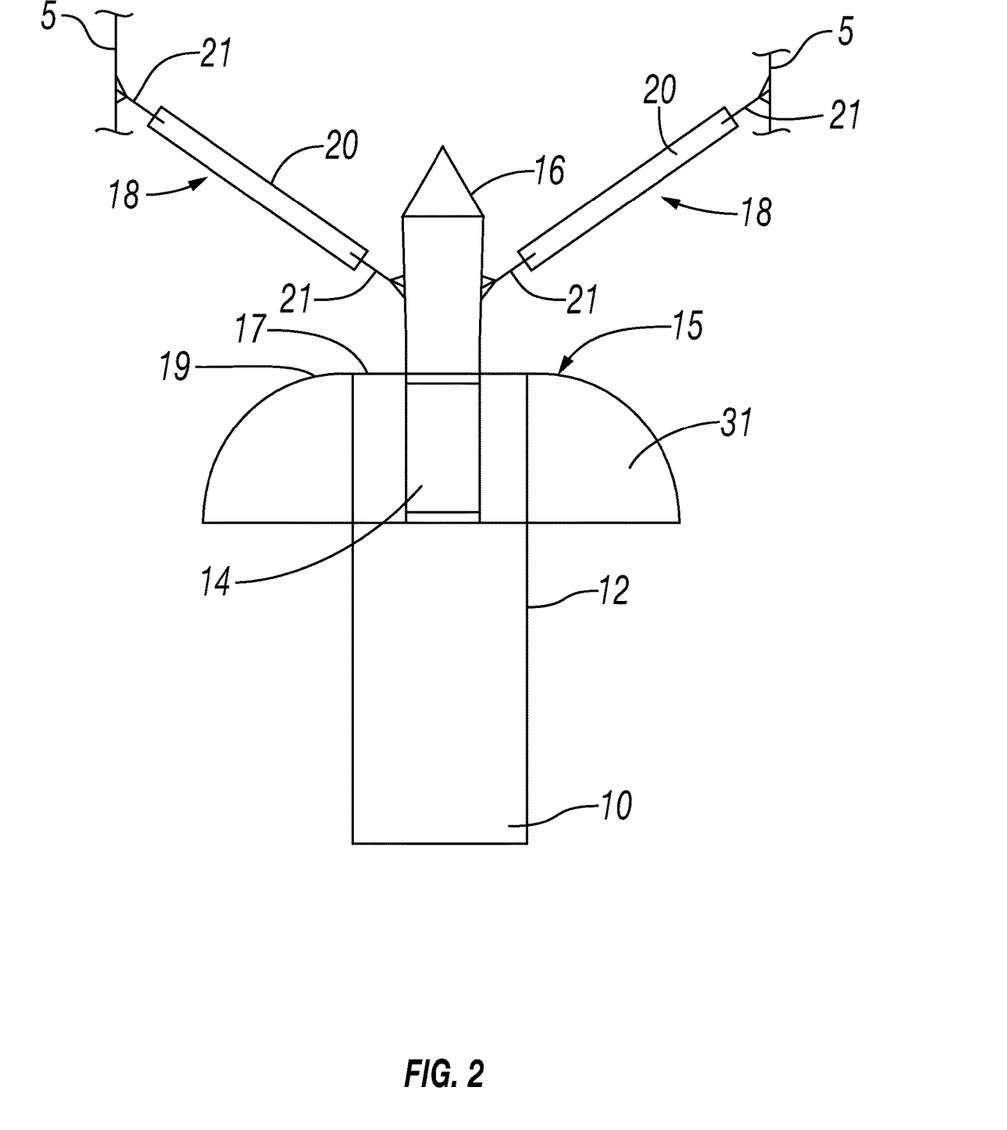
FIG. 2 is an elevational view of a top section of a first embodiment of a riser showing one embodiment of a riser termination device.

The riser section 10 has an outer wall 12, at least one opening 14 in the topmost section of the outer wall 12. Referring now to FIG. 2, an elevational view of a top portion of the riser section 10 is shown. The riser section 10 further includes a riser termination device 15 which caps the riser section 10. The riser termination device 15 includes a substantially internally flat cover plate 17.

Figure 5:
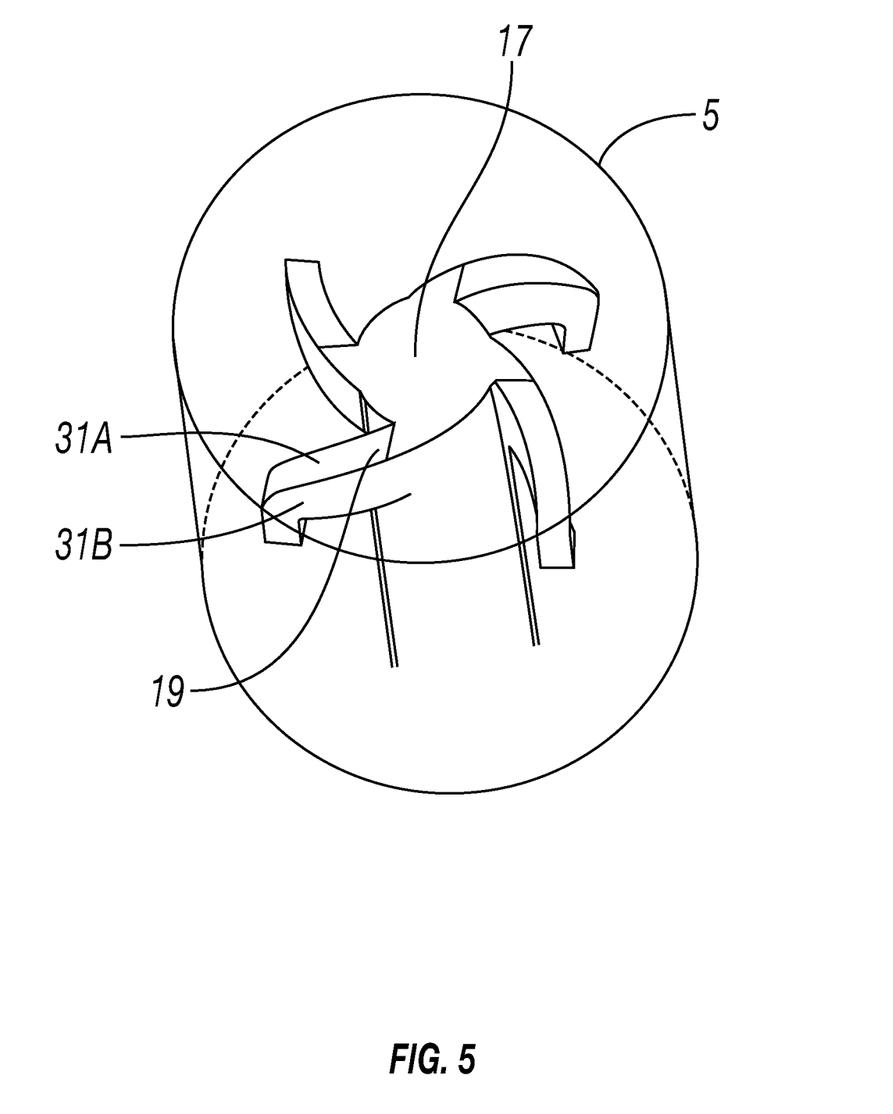
FIG. 5 is perspective view of a second alternative embodiment of a riser termination device.

For each opening 14, the riser termination device 15 includes at least one arm 19 which extends from the cover plate 15. Each at least one arm 19 is formed from an outer shell 31 which has a top portion 31a and two side portions 31b, as seen in FIG. 5. The outer shell 31 forms a partial cover over the opening 14. As shown in FIG. 2, no internal portion of the riser section 10 or cover plate 17 extends above the outer shell 31 of the at least one arm 19, with the proviso that the riser shell 12 may have an upper lip at opening 14 onto which the at least one arm 19 is attached. Therefore, the catalyst particles in the riser section 10 do not pass internally in the riser above the level of the opening 14.

As seen in FIG. 2, external components of the riser section 10 may extend above the level of the openings 14. Such external components may include a cap 16 which may be attached to the vessel 1 in order to stabilize and/or secure the riser section 10. As further shown in FIG. 2, the riser cap 16 may be held in place through one or more straps 18. Straps 18 may be connected to either or both of the vessel 1 and the riser cap 16 in a hinged manner permitting longitudinal and radial expansion and contraction. As shown in FIG. 2, each strap 18 comprises a tubular rod 20 having two open ends into which a metal strip 21 is inserted. Metal strips 21 are preferably sufficiently pliant to allow some flexion upon thermal expansion and contraction of the riser section 10.

Figure 3:
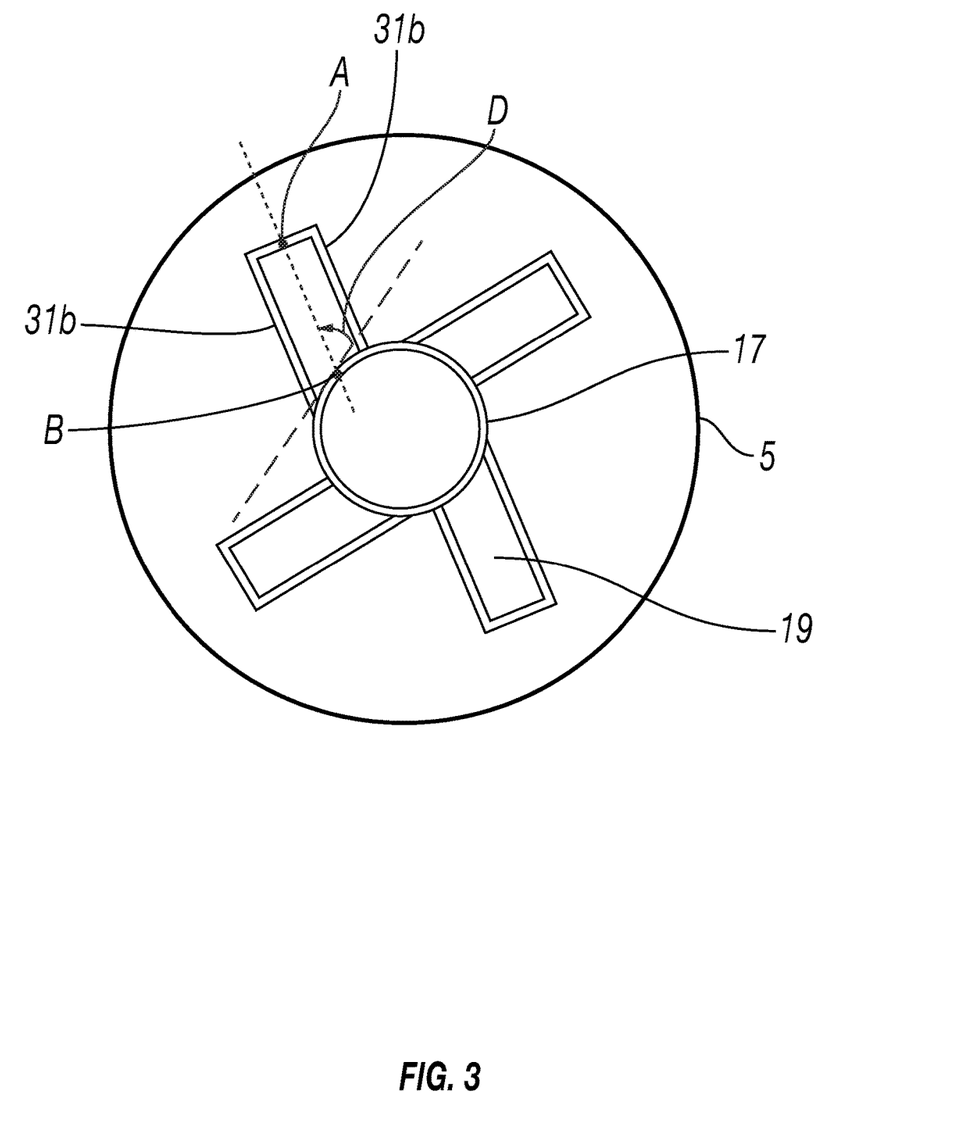
FIG. 3 is a top view of one embodiment of a riser termination device.
Figure 4:
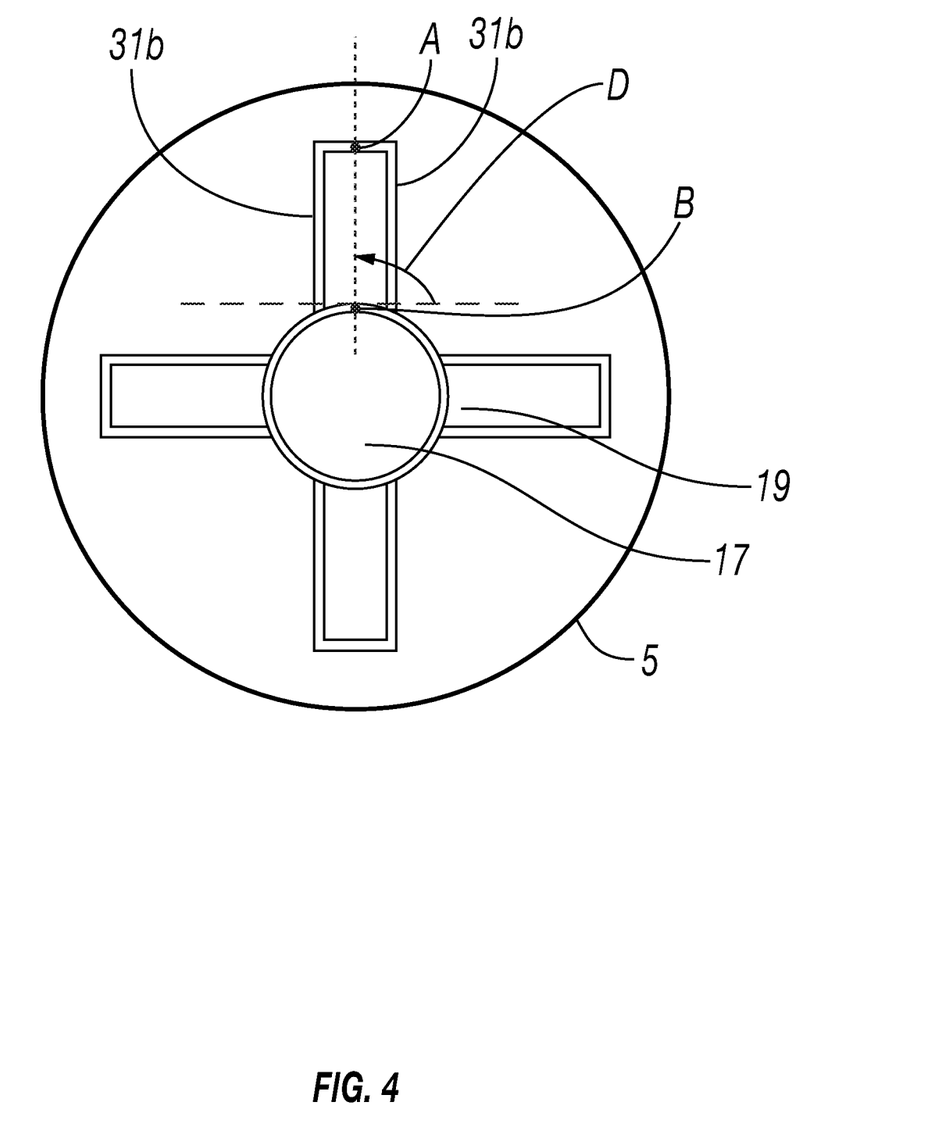
FIG. 4 is a top view of a first alternative embodiment of a riser termination device.

In one preferred embodiment, the at least one arm 19 extends tangentially or approximately tangentially from the cover plate, as shown in FIG. 3. In an alternative embodiment, the arm extends radially from the cover plate as shown in FIG. 4. To further describe the angle that the arm may extend from the cover plate, each of FIGS. 3 and 4 further denote point A as a centerpoint of between the two sides 31*b* of the arm 19. From point A, a dotted line is drawn wherein the dotted line is parallel to the two sides 31*b* of the arm 19. Where the dotted line intersect the outside edge of the cover plate 17 is point B. A dashed line is drawn tangential to cover plate 17 and passing through point B. The angle D between the dashed and dotted lines as shown in FIGS. 3 and 4 may range from 90° (as in the case of the arm extending radially) to 0°. All individual values and subranges from 0 to 90° are included and disclosed herein; for example, angle D can range from a lower limit of), greater than 0, 10, 20, 30, 40, 50, 60, 70, or 80 degrees to an upper limit of 10, 25, 35, 45, 55, 65, 75, 85 or 90 degrees. As used herein, angle D is defined as the "arm angle". The arm angle may be from 0 to 90°, or in the alternative, from 10 to 65°, or in the alternative, from 45 to 90°, or in the alternative, from 20 to 65°, or in the alternative, from 1 to 90°.

The at least one arm 19 may extend substantially horizontally outward from the cover plate 17 for a distance, as shown in FIG. 2 before turning downward. Alternatively, the at least one arm 19 may turn downward proximate to the cover plate 17 as shown in FIG. 5.

Figure 6:
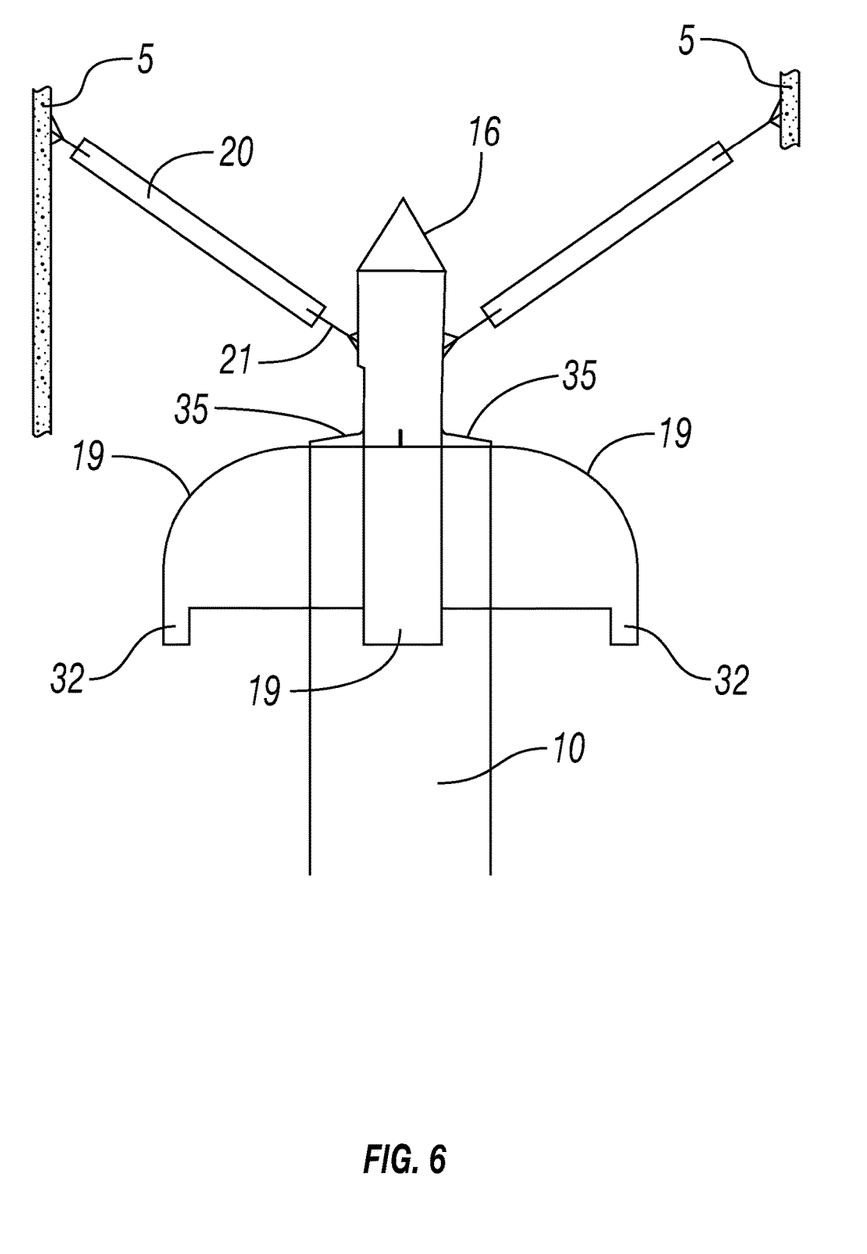
FIG. 6 is an elevational view of a top section of a first embodiment of a riser showing one embodiment of a riser termination device showing an alternative arm configuration.

FIG. 6 illustrates an alternative arm configuration wherein the arm includes an arm extension 32 which extends vertically below the side sections 31*b* of outer shell 31. FIG. 5 similarly shows such alternative arm configuration. The arm extension 32 may be in the shape of a squared or rounded U. FIG. 6 further illustrates stiffening ribs 35 used to provide mechanical strength to the riser cap 16. In an alternative embodiment, the arm extension 32 extends below a lower edge of opening 14.

In one embodiment, the aspect ratio (height divided by width) of the at least one slot ranges from 1.0 to 4.0. All individual values and subranges from 1.0 to 4.0 are included and disclosed herein; for example, the aspect ratio of the at least one slot may range from a lower limit of 1.0, 2.0, or 3.0 to an upper limit of 1.5, 2.5, 3.5 or 4.0. For example, the aspect ratio of the at least one slot may range from 1.0 to 4.0, or in the alternative, from 2.0 to 3.5, or in the alternative, from 1.0 to 2.5, or in the alternative, from 2.5 to 4.0.

The disclosure provides the catalyst regenerator and riser termination device according to any embodiment disclosed herein, except that the riser flux is from 1 to 200 lb/ft$^2$ sec. All individual values and subranges from 1 to 200 lb/ft$^2$ sec are included and disclosed herein; for example, the riser flux may range from a lower limit of 1, 25, 75, 120, 169, or 180 lb/ft$^2$ sec to an upper limit of 10, 50, 100, 150, or 200 lb/ft$^2$. For example, the riser flux may be from 1 to 200 lb/ft$^2$ sec, or in the alternative, from 1 to 100 lb/ft$^2$ sec, or in the alternative, from 100 to 200 lb/ft$^2$ sec, or in the alternative, from 5 to 100 lb/ft$^2$ sec, or in the alternative, from 1 to 50 lb/ft$^2$ sec.

The disclosure provides the catalyst regenerator and riser termination device according to any embodiment disclosed herein, except that the superficial velocity of the riser varies from 10 to 70 ft/s. All individual values and subranges from 10 to 70 ft/s are included and disclosed herein; for example, the superficial velocity of the riser can range from a lower limit of 10, 20, 30, 40, 50, or 60 ft/sec to an upper limit of 15, 25, 35, 45, 55, 65, or 70 ft/sec. For example, the superficial velocity of the riser may be from 10 to 70 ft/sec, or in the alternative, from 10 to 40 ft/sec, or in the alternative, from 40 to 70 ft/sec, or in the alternative, from 20 to 50 ft/sec.

In a particular embodiment, the velocity of the stream exiting the arms is determined by $X*(A_{riser}/A_{openings})$ wherein X is the velocity of the stream in the riser and $(A_{riser}/A_{openings})$ is the ratio of the cross section area of the riser $(A_{riser})$ to the sum of the cross-sectional areas of the openings 14 which communicate with the arms 19 and which are located at the top of the riser $(A_{openings})$. In one embodiment, $A_{riser}/A_{openings}$ is from 0.1 to 4.0. All individual values and subranges from 0.1 to 4.0 are included and disclosed herein; for example, X may range from a lower limit of 1.25, 1.35, 1.45, 1.55, 1.65, 1.75, or 1.85 to an upper limit of 1.3, 1.4, 1.5, 1.6, 1.7, 1.8, 1.9, or 2. For example, X may range from 1.25 to 2, or in the alternative, from 1.25 to 1.65, or in the alternative, from 1.55 to 2.

EXAMPLES

Using the BARRACUDA VIRTUAL REACTOR modeling software, which is commercially available for licensing from CPFD Software, LLC (Albuquerque, N.M.), the ability to separate catalyst particles from the gas in which it is entrained was modeled. In the Comparative Example, the riser termination device shown in FIG. 2 of U.S. Pat. No. 7,799,287 with four arms was modeled. The Comparative Example was modeled with the following parameters: total of the 4 riser opening area of 5256.6 in$^2$; and riser inlet area of 2375.8 in$^2$. In the Inventive Example, a riser termination device according to the present disclosure, having four arms extending tangentially from an internally flat cover plate, was modeled. The Inventive Example was modeled with a riser opening aspect ratio of 2.7; total of the 4 riser opening area of 5205.6 in$^2$; and riser inlet area of 2375.8 in$^2$. The conditions for both of the examples were as follows: riser diameter=55 inches; gas velocity through riser=35 ft/s; solids flow rate through riser=164.14 kg/s=1,300,000 lb/hr; and solids flux=21.89 lb/ft$^2$s. The Comparative Example model predicted separation of 88.4% of the entrained catalyst particles. The Inventive Example model predicted separation of 94.3% of the entrained catalyst particles.

The present invention may be embodied in other forms without departing from the spirit and the essential attributes thereof, and, accordingly, reference should be made to the appended claims, rather than to the foregoing specification, as indicating the scope of the invention.

We claim:

1. A catalyst regenerator for combusting carbonaceous deposits from a catalyst comprising:
  a first chamber comprising:
    a catalyst inlet, and
    an oxygen-containing gas distributor for distributing oxygen containing gas into the first chamber to contact a spent catalyst and combust the carbonaceous deposits from the spent catalyst; and
  a riser section extending from the first chamber for transporting the catalyst and a flue gas, the riser section comprising an outer wall, at least one slot in the outer wall, and a riser termination device which comprises a substantially internally flat cover plate and at least one arm extending from the cover plate, wherein the at least one arm extends about the slot from the outer wall and the at least one arm extends non-radially from the cover plate, the at least one arm comprising an outer shell, wherein no internal portion of the cover plate extends above an upper surface of the outer shell of the at least one arm, and wherein the riser section is configured so that, during operation of the catalyst regenerator, no catalyst particles in the riser section pass internally in the riser section above a level of the at least one slot.

2. The catalyst regenerator according to claim 1, wherein the outer shell of the at least one arm has a horizontal section extending outward for a predetermined distance from the cover plate.

3. The catalyst regenerator according to claim 1, wherein the at least one arm further comprises an arm extension extending below a lower edge of the at least one arm.

4. The catalyst regenerator according to claim 1, wherein the at least one arm comprises a lower arm section having a vertical U-shape.

5. The catalyst regenerator according to claim 1, further comprising a second chamber containing the at least one arm, the second chamber comprising a cyclone separator for separating the catalyst from the oxygen containing gas, a regenerated catalyst outlet and a flue gas outlet.

6. The catalyst regenerator according to claim 1, wherein $A_{riser}/A_{openings}$ is at least 0.1, wherein $A_{riser}$ is a cross-sectional area of the riser section and $A_{openings}$ is a sum of cross-sectional areas of the at least one slot in the outer wall.

7. The catalyst regenerator according to claim 1, wherein $A_{riser}/A_{openings}$ is from 0.1 to 4.0, wherein $A_{riser}$ is a cross-sectional area of the riser section and $A_{openings}$ is a sum of cross-sectional areas of the at least one slot in the outer wall.

8. The catalyst regenerator vessel according to claim 1, wherein the at least one arm turns downward proximate to the cover plate.

9. The catalyst regenerator according to claim 1, wherein an aspect ratio of the slot is from 1.0 to 4.0, wherein the aspect ratio is defined to be a height of the slot divided by a width of the slot.

10. The catalyst regenerator according to claim 1, wherein a riser flux is from 1 to 200 lb/ft$^2$-sec.

11. The catalyst regenerator according to claim 1, wherein a superficial velocity of the riser is from 10 to 70 ft/s.

12. The catalyst regenerator according to claim 1, wherein a velocity of a stream exiting the at least one arms is determined according to $X*(A_{riser}/A_{openings})$, wherein $A_{riser}$ is a cross-sectional area of the riser section and $A_{openings}$ is a sum of cross-sectional areas of the at least one slot in the outer wall.

13. A riser termination device comprising: (a) a substantially internally flat cover plate; (b) at least one arm extending non-radially from the cover plate; wherein the arm comprises an outer shell that encloses the arm and wherein no internal portion of the cover plate extends above an upper surface of the outer shell of the at least one arm.

14. The riser termination device according to claim 13, wherein the at least one arm extends tangentially from the cover plate.

15. The riser termination device according to claim 13, wherein an arm angle of the at least one arm is from 0 degrees to 85 degrees.

* * * * *